3,447,720
DISPENSING SYSTEM AND DISPENSER ASSEMBLY THEREFOR
Kenneth E. Janigian, Novato, and Arthur G. Lachman, San Francisco, Calif., assignors to Continental Room Service, Inc., San Francisco, Calif., a corporation of California
Filed Aug. 17, 1967, Ser. No. 661,256
Int. Cl. B67d 5/22
U.S. Cl. 222—36                     3 Claims

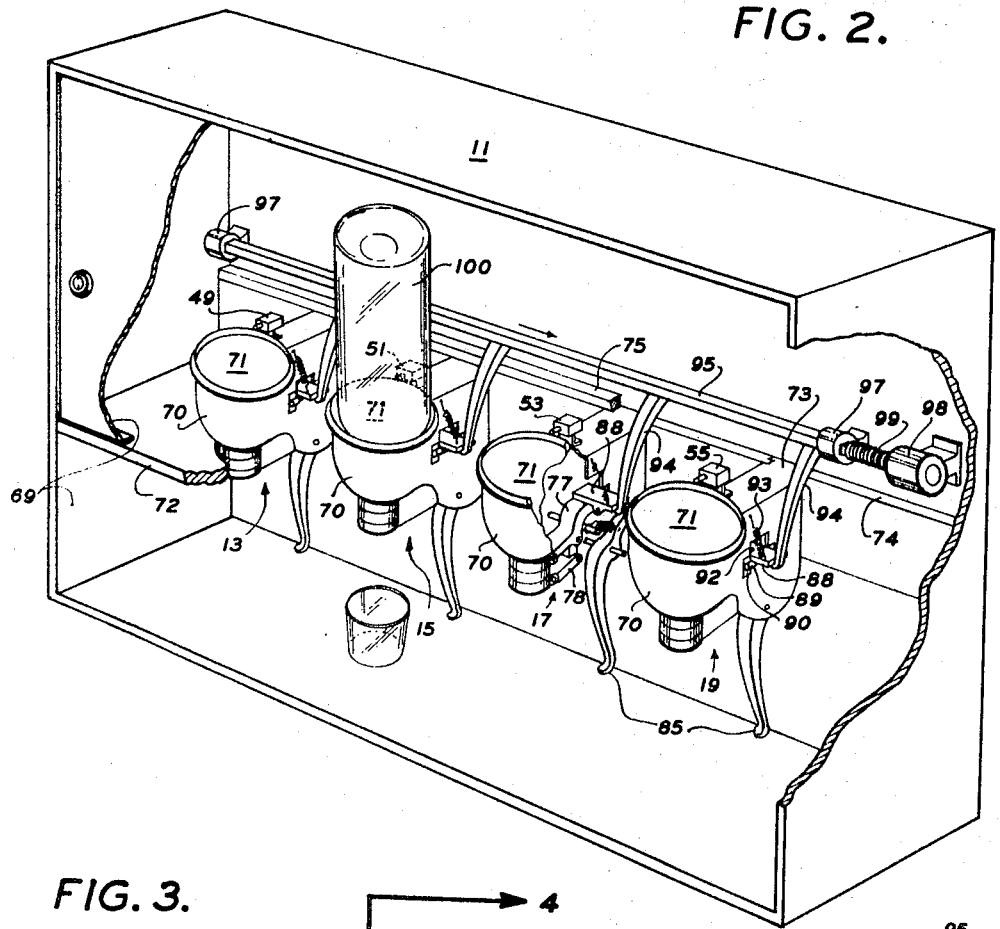
FIG. 2.
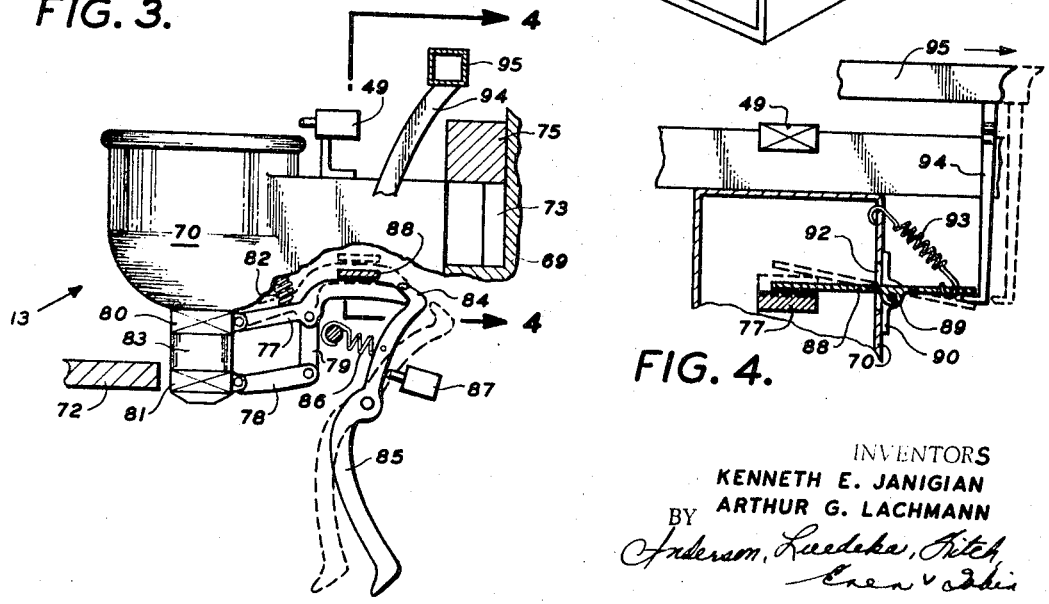
FIG. 3.
FIG. 4.
INVENTORS
KENNETH E. JANIGIAN
ARTHUR G. LACHMANN
BY
ATTORNEYS United States Patent Office 3,447,720
Patented June 3, 1969

ABSTRACT OF THE DISCLOSURE

A dispensing system and a dispenser assembly are described for dispensing a plurality of types of units by individual units. The dispenser assembly has a plurality of dispensers, one for each type of unit. The number of units dispensed and the individual and total price thereof may be monitored. In addition, the dispensers may be collectively disabled.

---

This invention relates to the automatic dispensing of various items in units, such as dispensing individual servings of beverages. More particularly, the invention relates to a system and to a dispenser assembly for automatically dispensing a plurality of types of units by individual units.

Apparatus is known in the art for automatically dispensing a variety of items in individual units. Although satisfactory for some purposes, such apparatus may not be entirely satisfactory for other purposes. For example, the dispensing of alcoholic beverages in individual portions presents certain problems outlined below. Other types of substances having characteristics, as far as dispensing is concerned, which are similar to alcoholic beverages may also present some or all of the following problems in designing a suitable dispensing system and apparatus.

Alcoholic beverages are generally not readily adapted to storage and dispensing other than in and from the original bottles in which the distiller distributes such beverages. This is due to several reasons. Bulk storage and automatic dispensing in and through many types of containers and ducts will adversely affect taste, either through contamination by erosion of the container or duct material, or through accumulation of residue in the container and ducts. Moreover, transfer of an alcoholic beverage or similar item from the bottle in which it is distributed by the distiller to other containers may be time consuming and laborious, illegal, and may offer an opportunity for larceny to untrustworthy personnel.

An alternative to bulk storage and automatic dispensing of alcoholic beverages and similar items is to automatically dispense the beverage in individual bottles or containers which are filled by the distiller or manufacturer and distributed in such form. Such small bottles for alcoholic beverages are sometimes used by commercial airlines in serving their passengers in flight. This alternative, however, may tend to be prohibitively expensive due to the increased bottling or packing costs. In addition, the liquor laws of many jurisdictions make a distinction between the dispensing of beverages from bottles and the sale of beverages in bottles. Thus, for legal reasons, it may be desirable to find a satisfactory alternative to automatically dispensing in individual bottles.

Assuming the foregoing difficulties are overcome, some problems still remain in the design of a satisfactory system and apparatus for dispensing units of liquor or units of other types of items having similar characteristics as far as dispensing is concerned. More specifically, automatic dispensing from bottles presents difficulty in keeping track of the number of units consumed and their price. The need for replacement of bottles must usually be determined in time to prevent the particuar item from running out. If a large number of dispensing stations are to be used, such as where a dispensing station is provided in each room of a hotel or motel, it may be difficult to perform the foregoing tasks without incurring excessive expenditure of time and money. Moreover, where local laws prevent the sale of alcoholic beverages during certain periods, control over the operation of a large number of dispensing stations may be difficult or expensive to maintain.

It is an object of this invention to provide an improved dispensing system and apparatus for dispensing a plurality of types of units by individual units.

Another object of the invention is to provide an improved dispensing system and apparatus which automatically dispenses units from replaceable containers.

Still another object of the invention is to provide a dispensing system and apparatus which facilitates keeping track of consumption and prices.

A further object of the invention is to provide a dispensing system and apparatus which may be easily rendered temporarily inoperable.

It is a further object of the invention to provide a dispensing system in which a plurality of dispensing stations may be incorporated and controlled.

Other objects of the invention will become apparent to those skilled in the art from the following description taking in connection with the accompanying drawings wherein:

FIGURE 2 is a perspective view of a dispenser assembly (with parts broken away) constructed in accordance with the invention and which may be incorporated in the system of FIGURE 1;

FIGURE 3 is a schematic side view of a dispenser used in the assembly of FIGURE 2, and FIGURE 4 is a sectional view taken along the line 4—4 of FIGURE 3.

Figure 1:
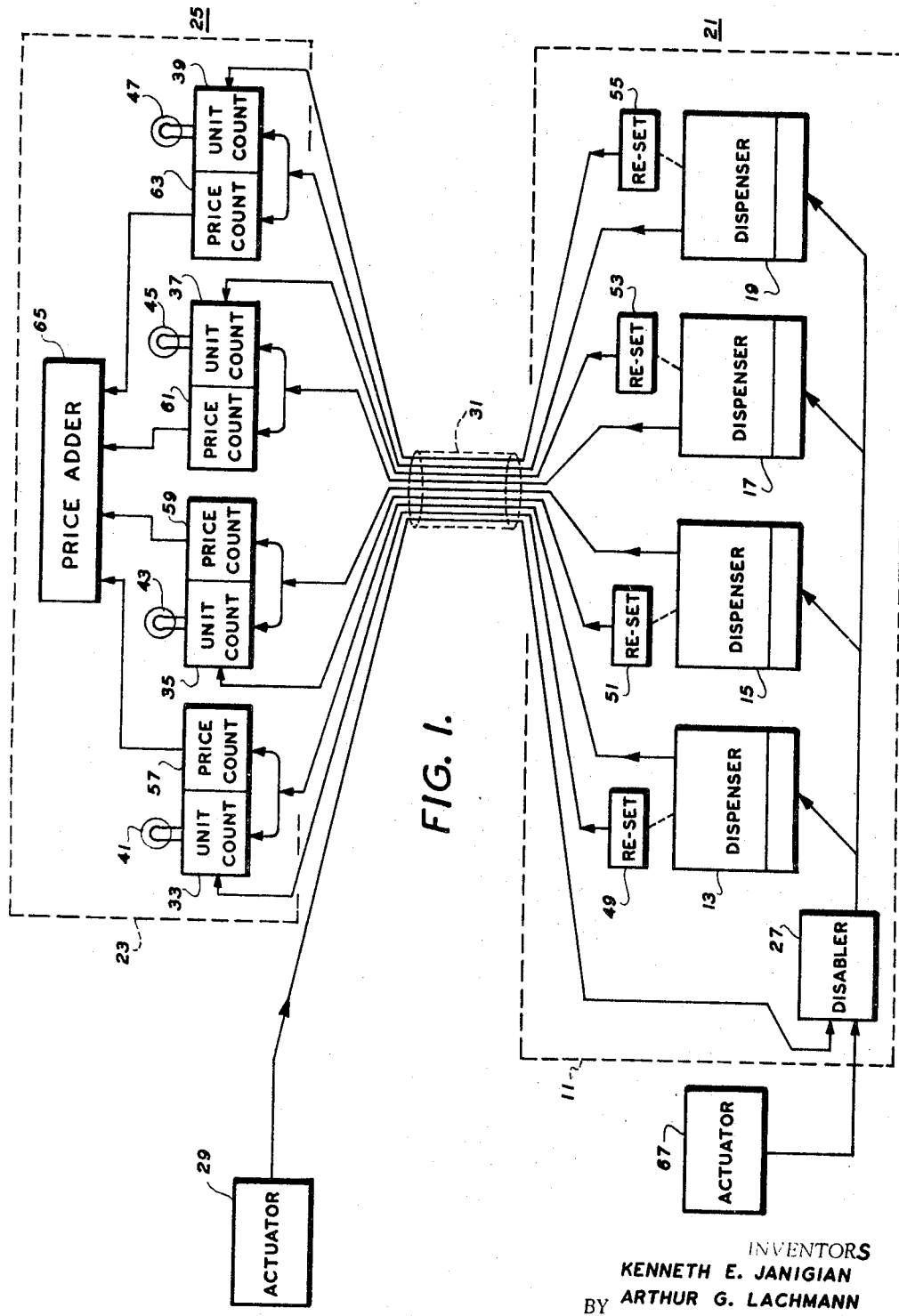
FIGURE 1 is a schematic diagram of a dispensing system constructed in accordance with he invention.

Very generally, the system of the invention comprises a dispenser assembly 11 having a plurality of dispensers 13, 15, 17 and 19, one for each type of unit to be dispensed. Each of the dispensers is operable to dispense individual units of a respective type and the dispensers are positioned at a dispensing location 21. Means 23 are provided at a control location 25 for monitoring the number of units dispensed by the dispensers. Means 27 are also provided for collectively disabling all of the dispensers, such disabling means being operable by actuating means 29 proximate the monitoring means.

The dispenser assembly 11 may include a cabinet or similar structure (described subsequently) in which the dispensers 13, 15, 17 and 19 are suitably supported. The cabinet may be installed in the wall of a hotel, motel, hospital, apartment house or office building. Alternatively, the cabinet may be supported on wheels or casters in order that it may be moved into and out of selected rooms.

The dispensers 13, 15, 17 and 19 may be of any suitable design for dispensing a particular desired type of unit by individual units, such as ounces of liquor, cups of powder, or individual packaged items. In the case of alcoholic beverages, the dispensers are preferably constructed to receive bottles of the particular types of liquor or other alcoholic beverage it is desired to dispense. Suitable means may be provided for supporting and locking the bottles in place on the dispenser and for enabling replacement of such bottles periodically when they become empty. A particular dispenser assembly which may be used is described in greater detail subsequently. A manually operable dispenser suitable for incorporation in the system and assembly of the invention is manufactured by AutoBAR Systems, a division of Ameteck Inc., Sellersville, Pa.

Each unit dispensed by each of the dispensers 13, 15, 17 and 19 is monitored in the monitoring means 23. In the illustrated embodiment, the monitoring means are disposed at a control location 25 which is remote from the location 21 of the dispensers. Electrical connection is maintained therebetween through a suitable connector cable 31. The cable 31 may be installed as original equipment with installation of the system or may comprise previously existing telephone lines or similar communications systems adaptable for carrying the additional information.

Each of the dispensers 13, 15, 17 and 19 actuates one of a corresponding number of unit counters 33, 35, 37 and 39, respectively. The unit counters may be of any suitable type known in the art which register a count increment in response to a pulse or similar signal. Actuation of the unit counters may be accomplished by means of a suitable signal such as a pulse produced by a solenoid or switch disposed on the dispenser and operable in response to operation of the dispenser. Actuation of the dispenser may be accomplished mechanically through manual means, as described subsequently, or may be accomplished through a suitable electrically actuated valve, not illustrated. The nature of the means in the dispenser which sends signals to the monitoring means upon operation of the dispenser will, accordingly, depend upon the nature of the dispenser itself. The unit counters operate in response to receipt of such signals to register an appropriate number of units. Each of the unit counters may be provided with a suitable indicator for displaying the total amount of units consumed by the particular dispenser being monitored.

As previously mentioned, it is contemplated that the units being dispensed by the dispensers 13, 15, 17 and 19 be contained in a suitable type of container, such as a bottle, which is removably supported in the dispenser. When the quantity of units in a particular container becomes low, it is desirable that the container be replaced before being emptied. To provide a warning of the need for replacement, each unit counter 33, 35, 37 and 39 is provided with a suitable warning device which is actuated after a predetermined number of units have been dispensed. The exact number selected will depend upon the capacity of the container or bottle, and the size of each unit dispensed. In the illustrated system the warning devices consist of warning lamps 41, 43, 45 and 47, respectively. Such warning lamps provide an indication at the control location 25 of a low supply in a corresponding dispenser.

When a container is replaced in one of the dispensers 13, 15, 17 and 19, it is necessary to reset the corresponding unit counters 33, 35, 37 and 39 to begin the count from a full container. To accomplish this, a reset device 49, 51, 53 and 55 is provided adjacent each dispenser. The reset device may be a switch, solenoid or other pulse producing means which provides a signal to the corresponding unit counter to cause it to be returned to the zero position. The reset device may be actuated manually or may be actuated automatically with replacement of a container, as in the dispenser assembly subsequently described.

In addition to the unit counters 33, 35, 37 and 39, price counters 57, 59, 61 and 63 are provided for the dispensers 13, 15, 17 and 19, respectively. The signals produced upon actuation of a dispenser are applied to the corresponding price counter. The price counter may be of a suitable known type and is set to register price increments corresponding to the price of each unit dispensed. A price adder 65 of suitable construction is provided which totals the prices in the price counters to obtain the total price of the units dispensed in any given period. The price counters and the price adder may be reset by suitable means, not illustrated, at the control location 25. The price counters and price adders are not reset upon actuation of the reset devices 49, 51, 53 and 55. The price counters and price adder may be reset at the option of persons controlling the system, such as when a hotel room guest checks out or when a monthly statement is issued.

Where the dispenser assemblies are located remotely from the control location 25, such as in hotel rooms, it may be very important that the dispensers be rendered inoperative for certain periods of time. The legal hours of liquor sales are one example, as previously discussed. In the case of a hotel or motel, festivities by occupants of the room may become over-exuberant after excessive consumption of alcoholic beverages, such as beverages of the type which may be dispensed in the system and apparatus of the invention. Accordingly, it may be desirable to render the dispenser assembly temporarily inoperative at certain strategic times in order to avoid disturbing other guests. To this end, the disabler 27 is provided. The disabler may be a suitable electrical switch operated by a remotely controlled relay in the case of electrically operated dispensers, or may, as in the subsequently described mechanical arrangement, be operated by an electric solenoid. In either case, the disabler 27 is controlled by an actuator 29 located at the control location 25. Connection between the actuator 29 and the disabler 27 may be made in the same manner as connections between the dispensers and the monitor means and the reset devices are made.

In addition to actuating the disabler from a control location, it may be desirable to have a local actuator 67 disposed at the dispensing location 21. The local actuator 67 may be operated to cause the disabler 27 to temporarily suspend operation of the dispensers 13, 15, 17 and 19. Operation of the local actuator 67 to put the disabler in condition to permit the dispensing of units may be accomplished by any suitable means. For example, operation may be initiated by means of a key given to a room guest or tenant upon their occupying the room in which the dispenser assembly 11 is disposed. Alternatively, operation of the actuator may be initiated by an identifying credit card which the user must insert in the machine and from which the machine may be suitably designed to record the identity of the user.

The technique of local operation of the local actuator 67 by identifying credit card or similar device may be utilized in connection with a dispenser assembly having the monitoring means 23 incorporated therein, that is, at the dispensing location. Thus, the recording of the units dispensed and the total purchase price may be recorded in the dispenser assembly and suitable means, not illustrated, may be utilized to provide a charge slip or bill with the appropriate information printed thereon. Such a device may, for example, be utilized in a cocktail lounge in place of a bartender, in which case waitresses may insert charge slips or bills in the machine to initiate operability thereof while at the same time the unit count and price count is recorded upon the charge slip or bill.

Referring now to FIGURE 2, a dispenser assembly 11 constructed in accordance with the invention is illustrated in perspective. The dispenser assembly 11 includes a suitable cabinet or frame 69, parts of which are indicated at various places in the drawing. The illustrated apparatus consists of the plurality of manually operable dispensers 13, 15, 17 and 19 each of which includes a housing 70 of plastic or other suitable material. Each dispenser housing includes a receptacle 71 for receiving a bottle of liquor. Suitable means, not illustrated, may be provided for locking the bottle of liquor in the receptacle after it has been inserted. The lower ends of the dispensers mate in and extend through openings provided in a panel 72 of the frame. A dovetail type of projection 73 extends from each of the receptacles 71 and mates in a corresponding dovetail recess in a shoulder 74 of the frame 69. A locking bar 75 is passed across the tops of such projections and the ends of the locking bar are screwed to the frame to thus securely hold the dispensers in place in the dovetail recesses. Such a construction inhibits unauthorized tampering.

Referring now to FIGURE 3, which schematically illustrates the dispenser 13 (the other dispensers being identical), the receptacle 71 is provided with a valve actuating linkage including two levers 77 and 78 joined by a floating link 79. The lever 77 operates a valve 80, and the lever 78 operates a valve 81. The two levers move together due to the action of the floating link 79. The levers are biased to move upwardly, from the positions shown in solid lines in FIGURE 3 to the positions shown in phantom, by a coiled spring 82. In the lower position of the levers, the lower valve 81 is closed and the upper valve 80 is open. In the upper position of the levers, the upper valve 80 is closed and the lower valve 81 opens to discharge liquid from a unit measuring chamber 83 located between the valves. Return of the levers to the lower position enables the chamber 83 to re-fill for the next dispensing operation.

Movement of the levers 77 and 78 to the upper position shown in phantom in FIGURE 3 is prevented by a cam 84 located on the end of an actuating lever 85 for the dispenser. The cam 84 rides over the end of the lever 77, which is ramp shaped to effect a smooth engagement. The cam 84 is biased to the position illustrated in solid lines by a spring 86, which is strong enough to overcome the bias of the spring 82. When the lever 85 is manually pulled against the bias of the spring 86, the ramp end of the lever 77 is released and the levers 77 and 78 move to the phantom position. Release of the lever 85 re-engages the cam 84 with the ramp end of the lever 77 and the bias of the spring 86 returns the levers 77 and 78 to their original positions. A signal for operation of the counting means is provided by a suitably positioned switch 87 which is actuated upon displacement of the dispenser lever 85.

In FIGURES 2 and 4, the dispenser assembly 11 is shown in the disabled condition. Although movement of the dispenser actuating lever 85 is possible in the disabled condition, as will be described, no liquid will be dispensed because the valve actuating levers 77 and 78 are unable to move. By disabling the apparatus in this manner, danger of breakage is minimized since there is little temptation or opportunity for a person to try to force operation of a dispenser. This is because, although the apparatus is disabled, the actuating lever 85 may still be moved.

Disabling of the dispenser assembly 11 is accomplished by disabling levers 88, one in each dispenser 13, 15, 17 and 19. Each disabling lever is pivotally mounted on an axle 89 secured by brackets 90 to the corresponding dispenser housing 70. The disabling lever 88 extends through an opening 92 in the dispenser housing 70 and its inner end rests on the top of the lever 77, just adjacent the ramp end thereof. The disabling lever 88 is biased to this position by a coil spring 93 which produces a force which is relatively weak compared with the opposite force produced by the coil spring 82. Thus, upon displacement of the actuating lever 85, the inner end of the lever will move up with the lever 77 unless the apparatus is disabled by preventing such movement.

Movement of the disabling levers 88 is prevented in the disabled condition by means of a plurality of fingers 94, one for each dispenser, which lock under and engage the corresponding outer ends of the disabling levers 88. When the fingers 94 are engaged with the disabling levers 88, downward movement of the outer ends thereof is prevented. This prevents upward movement of the inner ends of the disabling levers, thereby preventing upward movement of the levers 77 and 78 which would open the valves 80 and 81.

The disabler fingers 94 in the illustrated embodiment are secured to an elongated bar 95 journalled between suitable brackets 97 (FIGURE 2). One end of the bar 95 is secured to the plunger of a solenoid 98 biased by a spring 99. With the solenoid 98 not energized, the bar 95 is urged to the illustrated position by the solenoid plunger spring 99, and the free ends of the fingers 94 engage the corresponding outer ends of the disabling levers 88 to prevent movement thereof in a direction which would permit the valves 80 and 81 to open and cause liquid to be dispensed. Upon axial movement of the bar 93 in the direction of the arrow adjacent thereto by energization of the solenoid 98, the fingers 94 are moved away from the disabling levers, in the direction toward the solenoid 98 (shown in phantom in FIGURE 4), a distance sufficient to permit movement of the disabling levers. This permits operation of the dispensers.

The invention is not intended to be limited to the particular construction illustrated in FIGURE 2. For example, various types of cam mechanisms may be designed to prevent operation of the dispensers, depending upon the particular construction of the dispensers. Moreover, actuation of the disabler may be carried out manually or by means other than an electric solenoid, such as by electric motor or hydraulic piston.

In the apparatus illustrated in FIGURE 2, the reset devices 49, 51, 53 and 55 comprise switches mounted on the respective housings 70 adjacent the receptacles 71. The actuators for the switches extend in a manner that will strike a container 100 positioned in the receptacle. Accordingly, when a container is removed and replaced, the switch adjacent the particular receptacle will be actuated through contact with the container and provide a reset signal for the corresponding unit counter with which it is coupled. Other ways of actuating the reset devices are also possible. For example, if some type of movable mechanism is used to lock or attach the bottles in the receptacles, movement of the locking or attaching mechanism may be used to operate the reset device.

It may therefore be seen that the invention provides an improved system and apparatus for dispensing a plurality of types of units by individual units. The system is readily adaptable to remote control. Although only a single dispenser assembly 11 has been illustrated in FIGURE 1, for purposes of clarity, a plurality of dispenser assemblies may be utilized, with the counting means 23 and disabler actuators 29 for each assembly disposed at a central or control location. Accurate counting of both units and price is readily achieved, and the dispenser assemblies may be disabled automatically.

Various modifications of the invention in addition to those shown and described herein will become apparent to those skilled in the art from the foregoing description and accompanying drawings.

What is claimed is:

1. A system for dispensing a plurality of types of units by individual units, comprising, a plurality of dispenser assemblies each having a plurality of dispensers, one for each type of unit, each of said dispensers being operable to dispense individual units of a respective type, said dispenser assemblies being positioned at distributed dispensing locations, means at a control location remote from said dispensing locations for monitoring the number of units dispensed by each of said dispensers, each of said dispenser assemblies having means for collectively disabling all of said dispensers therein, and actuating means proximate said monitoring means for operating said disabling means in selected dispenser assemblies.

2. A dispenser assembly for dispensing a plurality of types of units by individual units, comprising, a plurality of dispensers, one for each type of unit, each of said dispensers being operable to dispense individual units of a respective type, each of said dispensers being adapted for holding a replaceable container for the units, means for monitoring the number of units dispensed by each of said dispensers and for providing an indication when a given number of units have been dispensed from any one of said dispensers, and means for resetting said number monitoring means for a given dispenser in response to replacement of a container for said given dispenser.

3. A system for dispensing a plurality of types of units by individual units, comprising, a dispenser assembly having a plurality of dispensers, one for each type of unit, each of said dispensers being operable to dispense individual units of a respective type, said dispensers being positioned at a dispensing location, means at a control location remote from said dispensing location for monitoring the number of units dispensed by said dispensers, each of said dispensers including means for supporting a replaceable container having a supply of units therein, and reset means adjacent each of said dispensers for resetting said counting means upon replacement of a container.

References Cited
UNITED STATES PATENTS

| | | | |
|---|---|---|---|
| 1,381,839 | 6/1921 | Jackson | 221—152 |
| 1,568,764 | 1/1926 | Nizamis | 221—271 X |
| 2,118,994 | 5/1938 | Wade | 221—152 X |
| 2,323,681 | 7/1943 | Sangster et al. | 221—152 X |
| 2,704,629 | 3/1955 | Andre et al. | 221—271 X |
| 3,119,485 | 1/1964 | Bayers | 194—13 |
| 3,310,198 | 3/1967 | Regan et al. | 221—7 |
| 3,341,073 | 9/1967 | Arps et al. | 222—36 |

SAMUEL F. COLEMAN, *Primary Examiner.*

U.S. Cl. X.R.

221—152